United States Patent
Esarey et al.

(10) Patent No.: US 9,907,318 B2
(45) Date of Patent: Mar. 6, 2018

(54) COOLING ASSEMBLY FOR CHILLING OR FREEZING LIQUID INGREDIENTS

(71) Applicant: Industrial Revolution, Inc., Tukwila, WA (US)

(72) Inventors: Graeme Esarey, Seattle, WA (US); Lee Rawls, Woodinville, WA (US)

(73) Assignee: Industrial Revolution, Inc., Tukwila, WA (US)

( * ) Notice: Subject to any disclaimer, the term of this patent is extended or adjusted under 35 U.S.C. 154(b) by 0 days.

(21) Appl. No.: 14/214,582

(22) Filed: Mar. 14, 2014

(65) Prior Publication Data

US 2014/0318172 A1    Oct. 30, 2014

Related U.S. Application Data

(60) Provisional application No. 61/793,728, filed on Mar. 15, 2013.

(51) Int. Cl.
  *A23G 9/08*   (2006.01)
  *A01J 9/04*   (2006.01)
  (Continued)

(52) U.S. Cl.
  CPC ............. *A23G 9/086* (2013.01); *A01J 9/04* (2013.01); *B65D 25/2858* (2013.01);
  (Continued)

(58) Field of Classification Search
  CPC .. B65D 85/78; B65D 81/18; B65D 2525/288; B65D 2525/283; B65D 2525/284; B65D 25/2858; B65D 25/2835; B65D 2525/28; B65D 25/28; B65D 51/242; B65D 51/249; A01J 9/04; A23G 9/086; A23G 9/10; A23G 9/222; A23G 9/227; F25D 5/02; F25D 5/00; F25D 2303/083; F25D 2303/0831; F25D 3/06; F25D 3/08
  (Continued)

(56) References Cited

U.S. PATENT DOCUMENTS

| 200,065 | A | * | 2/1878 | Kloozewski | 215/6 |
| 553,158 | A | * | 1/1896 | Harton | 165/90 |
| 751,168 | A | * | 2/1904 | Hadley | 62/298 |
| 1,512,945 | A | * | 10/1924 | Norcross | 217/36 |

(Continued)

OTHER PUBLICATIONS

Cotradeco, website screen shot, https://web.archive.org/web/20110512101332/http://cotradeco.com/pages/189-uco-ice-cream-ball-recipes, May 12, 2011, United States on www.archive.org.

*Primary Examiner* — Jeffrey Allen
*Assistant Examiner* — Jennifer Castriotta
(74) *Attorney, Agent, or Firm* — DWC Law Firm, P.S.; David Chen (57) ABSTRACT

Cooling assemblies having a sealable cooling chamber formed as the interior volume of a curved or spherical outer container and a sealable inner canister are disclosed. The outer container may be provided as a multi-layer container having an external elastomeric shell. The external elastomeric shell may have an inner framework including a plurality of longitudinal ribs and a reinforcing wall. A movable flap adjustable between a projecting condition in which the flap extends from the exterior surface of the outer container and a closed position in which the flap doesn't project may be provided for supporting the cooling assembly in a stationary condition and the flap may be used as a handle for opening a lid.

21 Claims, 5 Drawing Sheets

(51) Int. Cl.
  *F25D 5/02* (2006.01)
  *F25D 3/06* (2006.01)
  *F25D 3/08* (2006.01)
  *B65D 25/28* (2006.01)
  *B65D 51/24* (2006.01)
  *B65D 81/18* (2006.01)
  *B65D 85/78* (2006.01)
  *A23G 9/10* (2006.01)

(52) U.S. Cl.
  CPC ........... *B65D 51/249* (2013.01); *B65D 81/18* (2013.01); *B65D 85/78* (2013.01); *F25D 3/06* (2013.01); *F25D 3/08* (2013.01); *F25D 5/02* (2013.01); *A23G 9/10* (2013.01); *B65D 2525/283* (2013.01); *B65D 2525/288* (2013.01); *F25D 2303/083* (2013.01)

(58) Field of Classification Search
  USPC ....... 220/592.12–592.15, 503–506, 524, 527
  See application file for complete search history.

(56) References Cited

U.S. PATENT DOCUMENTS

| | | | | |
|---|---|---|---|---|
| 2,096,791 | A * | 10/1937 | Cusanelli | 217/75 |
| 3,163,544 | A * | 12/1964 | Valyi | 426/112 |
| 3,401,827 | A * | 9/1968 | Messina | B65D 15/14 220/212.5 |
| 3,470,929 | A * | 10/1969 | Thornton | 220/233 |
| 4,179,904 | A * | 12/1979 | McClenny | 62/342 |
| 4,225,052 | A * | 9/1980 | Tector | A47J 41/0072 206/508 |
| 5,857,351 | A * | 1/1999 | Angus et al. | 62/342 |
| 6,766,917 | B1 * | 7/2004 | Blewitt, III | B65D 41/3423 215/252 |
| 7,287,656 | B2 * | 10/2007 | Guilford et al. | 215/11.1 |
| 8,783,490 | B2 * | 7/2014 | Gupta et al. | 220/23.87 |
| 2004/0105917 | A1 * | 6/2004 | Mannion | A47F 5/04 426/110 |
| 2010/0116825 | A1 * | 5/2010 | Young | 220/524 |
| 2011/0155613 | A1 * | 6/2011 | Koenig | B65D 21/0223 206/503 |
| 2014/0103033 | A1 * | 4/2014 | Beckman | 220/4.01 |

* cited by examiner

COOLING ASSEMBLY FOR CHILLING OR FREEZING LIQUID INGREDIENTS

CROSS REFERENCE TO RELATED APPLICATION(S)

This application claims the benefit of U.S. provisional patent application Ser. No. 61/793,728 (filed Mar. 15, 2013) which is incorporated herein by reference in its entirety.

BACKGROUND

1. Technical Field

The following disclosure relates to cooling assemblies having a sealable cooling chamber for cooling liquids or other materials contained in an inner canister and, in particular, relates to cooling assemblies such as ice cream makers having an inner canister for receiving ice cream ingredients and a sealed cavity formed between the inner canister and an outer wall for receiving a chilling substance such as an ice/salt mixture.

2. Related Art

Various types of ice cream and frozen dessert makers are known in the patent literature and many different ice cream makers have been sold commercially. Many ice cream makers have a thermally conductive canister containing the liquid ingredients that mounts in a larger reservoir into which ice and salt are mixed. The ingredient canister is turned or agitated to cool the ingredients in the canister by exposure to the cooled surface of the thermally conductive canister, which is cooled by the ice/salt mixture. Various types of paddles and stirrers have been developed to agitate the liquid ingredients within the canister during the process to facilitate cooling and mixing of the liquid ingredients.

Manual turning and agitation of the canister during the ice cream making process is tedious, and motorized turning systems have been developed. Drawbacks of motorized systems include the necessity of having a nearby electrical source and the possibility of stalling or burning out the motor as a consequence of the canister jamming in the ice/salt bath or an agitation device jamming in the canister.

U.S. Pat. No. 5,857,351, which is incorporated herein by reference in its entirety, discloses an ice cream maker having an inner container with a lid, the inner container being insertable within an outer container, wherein the outer container is encased in a spherical jacket. Ingredients for a frozen dessert may be inserted into the inner container and a mixture of rock salt and ice is insertable in a space between the inner and outer containers. Another lid, formed integrally with the jacket, seals the ice and rock salt in a reservoir located between the inner and outer containers. Because the outer container is spherical, cooling and agitation of the liquid ingredients in the inner container can be accomplished by rolling or tossing or otherwise playing with the spherical ice cream maker to agitate and cool the liquid ingredients. This eliminates any requirement of a motor and provides a fun and entertaining ice cream making experience.

SUMMARY

The present disclosure is directed to a cooling assembly comprising a sealable and thermally conductive inner canister that can be received in a sealable outer container, and in which the outer container or an intermediate surface provides a sealable cooling chamber located between the inner canister and the outer container. The cooling assembly may be employed as a frozen dessert maker and for chilling or freezing other types of liquids and other materials contained in the inner canister. In some embodiments of the present disclosure, the external configuration of the outer container is curved. In some embodiments, the external configuration of the outer container is generally or partially spherical, and the cooling assembly may be rolled or tossed or otherwise manipulated to provide entertainment while agitating and cooling the liquids contained within the canister.

The interior volume of the inner canister can be alternately sealed and accessed by means of a canister lid that mounts sealably at a first location on a surface of the cooling assembly. Likewise, the cooling chamber located between the inner canister and the outer container is accessible through a port provided in the surface of the outer container at a second location and can be sealed and accessed by means of a cooling chamber lid that mounts sealably at the second location.

In some embodiments, one or both of the lids may incorporate or be associated with a movable flap that can be adjusted and moved without affecting the seal formed between the lid(s) and the outer container when the lid(s) are sealed. In some embodiments, the movable flap can be adjusted between a "closed" position in which the flap doesn't project from the surface of the outer container and may be generally flush with the surface of the outer container, and a "projecting" position in which the flap projects from the surface of the outer container.

In some embodiments, when the movable flap is in the projecting position, or a partially projecting position by having been pulled away from the closed position, the movable flap can be gripped by a user to help unscrew the corresponding lid Also, when at least one flap is positioned in a projecting position, it may serve to stably support the cooling assembly in a stationary condition. This feature is particularly useful to facilitate loading of material in the inner canister when it is mounted in an outer container that is curved and/or spherical and doesn't have a flat surface for maintaining the assembly in a stationary condition. This feature is also useful to facilitate loading of a cooling substance (e.g., an ice and salt mixture) in the cooling chamber located intermediate the inner canister and the outer container. When two movable flaps are positioned in a projecting condition, stable positioning of a curved or spherical or irregularly shaped cooling assembly may also be provided.

In some embodiments, a movable flap may be pivotably mounted on a lid. In additional embodiments, the pivoting feature of a pivoting flap may additionally provide one or more mechanical stop locations along the pivot path to provide stable positioning of the flap at different rotational orientations with respect to the surface of the lid and of the outer container. In some embodiments, the two lids and movable flaps are located at substantially opposite locations on the outer container. In this configuration, the cooling assembly can be maintained in a stationary condition for loading the inner canister when the flap associated with the cooling chamber lid projects, and the cooling assembly can also be maintained in a stationary condition for loading the cooling chamber when the flap associated with the lid sealing the inner canister projects.

In some embodiments, the outer container has a multilayer structure comprising an external elastomeric shell and a rigid internal shell. The external elastomeric shell may be constructed from a material having viscoelastic or rubbery properties. Elastomeric polymers such as saturated, unsaturated and polysulfide rubbers and thermoplastic elastomers may be suitable for fabricating external elastomeric shells as disclosed herein. Ethylene vinyl acetate (EVA) is one such thermoplastic elastomer and is suitable for fabrication of elastomeric shells as described herein.

The rigid internal shell may be constructed from a thermoplastics, such as, for example, polyphenylene ether ("PPE"). The rigid internal shell may be generally constructed from a generally rigid plastic or another rigid material. The rigid internal shell is generally constructed from a material having high impact resistance and low thermal conductivity.

When the outer container has a multi-layer construction as described above, "major" surfaces of the external and internal shells may not contact one another directly. In some embodiments, the external elastomeric shell has structures protruding from its interior surface that provide an air space between the external and internal shells when the external and internal shells are assembled in the cooling assembly. In some embodiments, the interior surface of the external elastomeric shell comprises a plurality of inwardly extending ribs oriented substantially longitudinally along the major surface of the external shell. The inwardly extending ribs may contact the rigid internal shell when the multi-layer outer container is assembled, providing both a stand-off and an airspace between the external and internal shells forming the outer container. This stand-off and airspace feature may provide an insulating chamber between the cooling chamber and the ambient exterior environment, thereby reducing heat transfer across the outer container and facilitating rapid and efficient cooling of materials in the inner canister. This feature may also cushion the major surface of the elastomeric shell and preserve a substantial degree of shell flexibility, providing a more approachable and comfortable object for rolling, tossing and otherwise maneuvering during a cooling operation.

In yet additional embodiments, an external elastomeric shell comprises an internal wall extending substantially around and spaced a distance from the major surface of the external shell. The internal wall may provide structural reinforcement for the elastomeric shell and is preferably provided at a generally central (as opposed to polar) location. The internal wall may also incorporate interface features that, in combination with mating interface features provided on a rigid internal shell, facilitate mounting of the internal and external shells to one another. In one embodiment, for example, an internal wall of the external elastomeric shell provides openings or cavities configured and positioned to receive projections or tabs provided on the rigid internal shell to facilitate positioning and mounting of the external and internal shells to one another.

DETAILED DESCRIPTION

Figure 3:
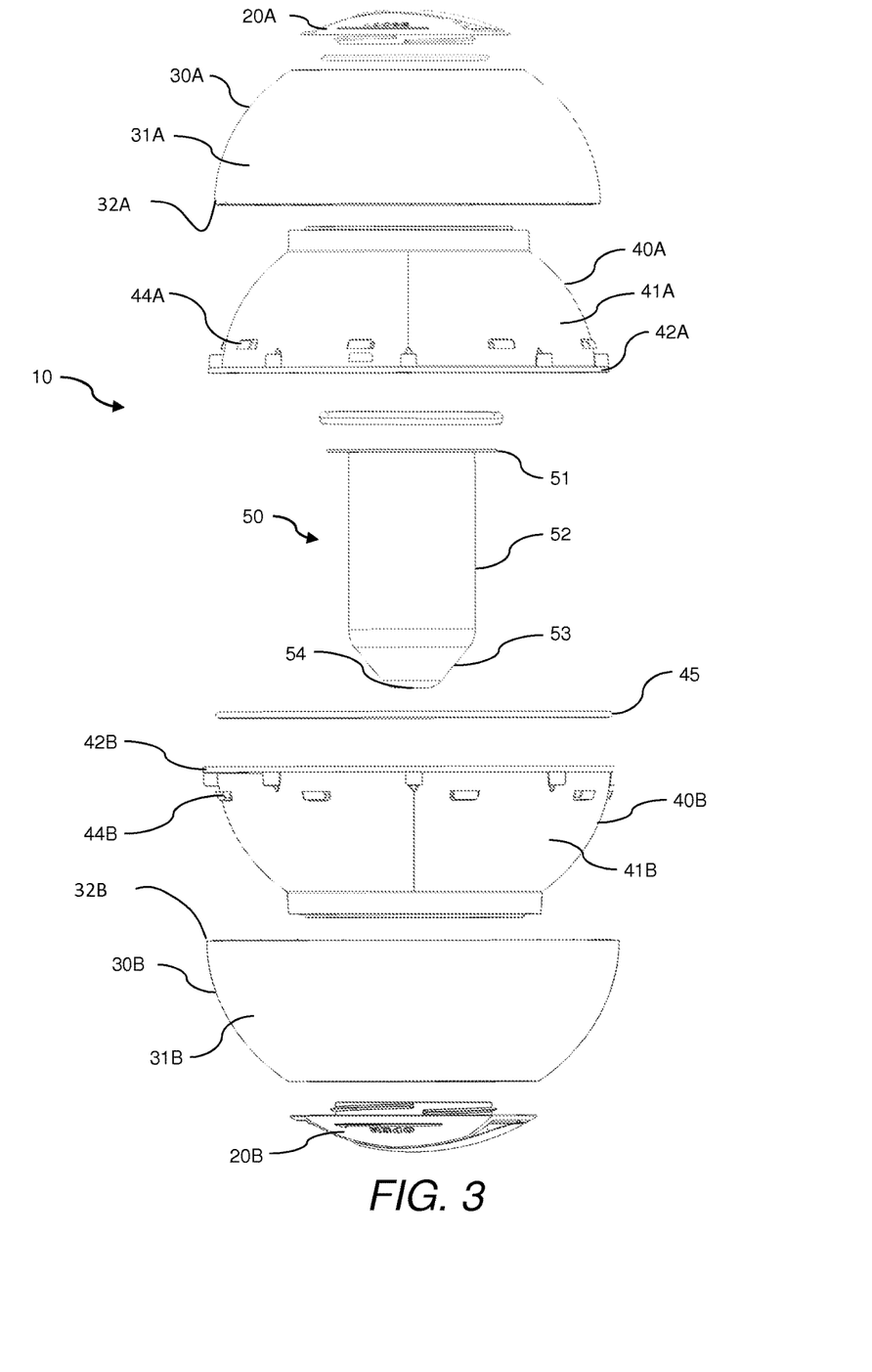
FIG. 3 shows an exploded view illustrating exemplary components and an exemplary arrangement of components according to one embodiment of a cooling assembly as disclosed herein.
Figure 4:
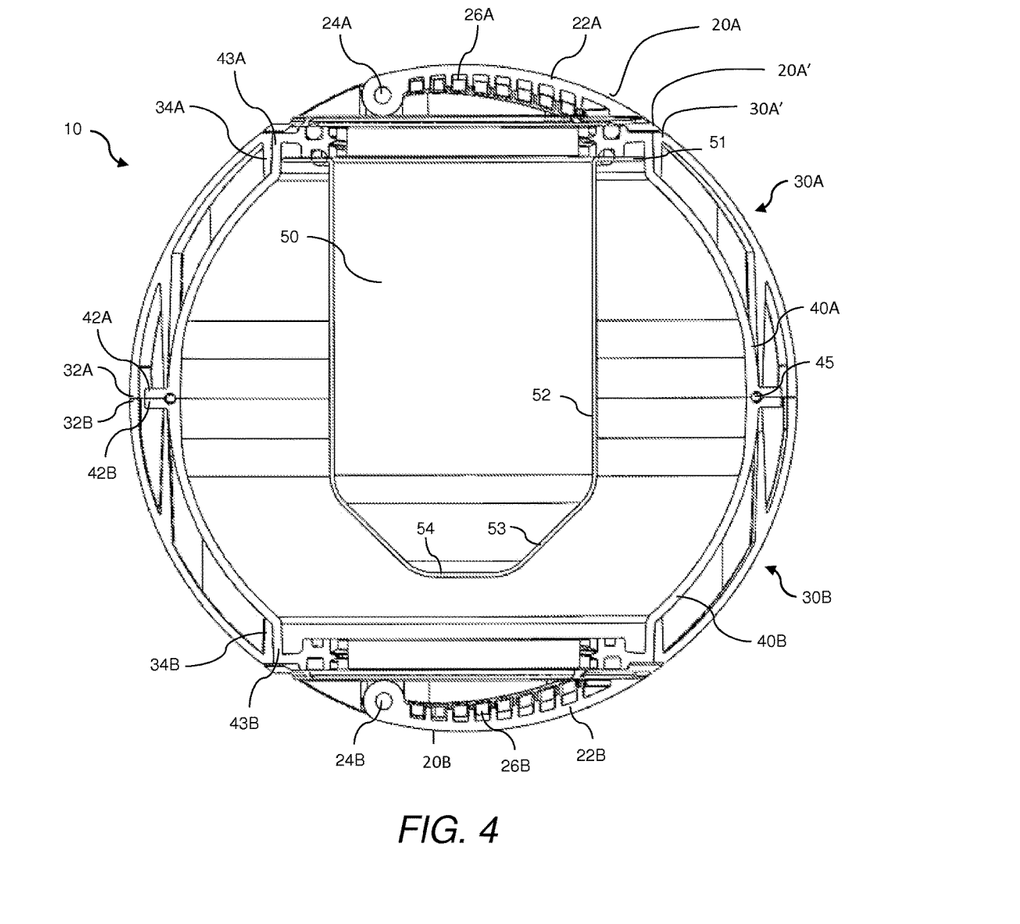
FIG. 4 shows a cross-sectional view of a cooling assembly and cooling assembly components of the type illustrated in FIG. 3.

FIG. 3 illustrates an exploded view of one exemplary construction of a cooling and/or freezing assembly 10 of the present disclosure (referred to herein simply as a "cooling assembly"), and FIG. 4 illustrates a cross-sectional view of an assembled cooling assembly 10. In the exemplary embodiment illustrated, cooling assembly 10 comprises an inner canister lid 20A and a cooling chamber lid 20B; external elastomeric shell components 30A, 30B; rigid internal shell components 40A, 40B; inner canister 50; and sealing members such as gaskets, providing substantially water-tight seals at the interfaces of various components. The external elastomeric shell and internal rigid shell components have partially spherical major surfaces 31A, 31B and 41A, 41B, respectively, and are fabricated as partially hemispherical components that can be assembled and, in combination with lids, provide a generally spherical outer container.

The outer container formed by the combination of lids 20A, 20B, external elastomeric shell components 30A, 30B and rigid internal shell components 40A, 40B has an internal volume that provides a cooling chamber surrounding inner canister 50. The cooling chamber is accessible through a port provided in the outer container that receives and is sealed by cooling chamber lid 20B. Inner canister 50 is accessible through a port provided in the outer container that receives and is sealed by inner canister lid 20A. During operation, the inner canister is loaded with liquids (or other materials) desired to be chilled and/or frozen, and the cooling chamber is filled with a cooling material, such as an ice and salt mixture (or other types of cooling materials). When the lids are installed and sealed, the cooling assembly can be rolled, tossed, shaken and otherwise agitated to facilitate cooling and/or freezing of the material loaded in the inner canister.

In the embodiment illustrated, inner canister 50 provides an internal volume for receiving liquids (or other materials) to be chilled or frozen. It has a generally cylindrical configuration, with an enlarged rim 51 formed at an open end of the canister, cylindrical side wall 52 extending from enlarged rim, or flange 51, and a tapered, generally conical lower region 53 terminating in a generally flat lower wall 54. Inner canister 50 is preferably constructed from a substantially rigid material having a high thermal conductivity, such as a metallic material. When assembled, inner canister 50 is suspended in the cooling chamber, which is formed as a sealed internal volume of the outer container.

Inner canister lid 20A and outer container lid 20B can be securely mounted in ports provided in the outer container. Sealing engagement between lids 20A, 20B may be provided by threaded engagement of the lids in respective ports, a bayonet-type mount system provided in the lids and respective ports, or the like. Many well-known types of mechanisms may be provided for seating and sealing lids 20A, 20B in respective ports provided in the outer container. In some embodiments, as shown in FIGS. 3 and 4, lids 20A, 20B have a curved and/or partially spherical external configuration with an inwardly extending rim having engagement mechanisms (such as threads, grooves, projections or the like) for mating with cooperating engagement mechanisms provided at the port.

In some embodiments, as illustrated herein, the ports for receiving lids 20A, 20B are located generally opposite one another on the surface of the outer container and lids 20A, 20B, when installed, are located generally opposite one another on the spherical surface. In some embodiments, the ports and lids 20A, 20B are located at opposite, generally polar regions of a spherical assembly, as shown.

Figure 1:
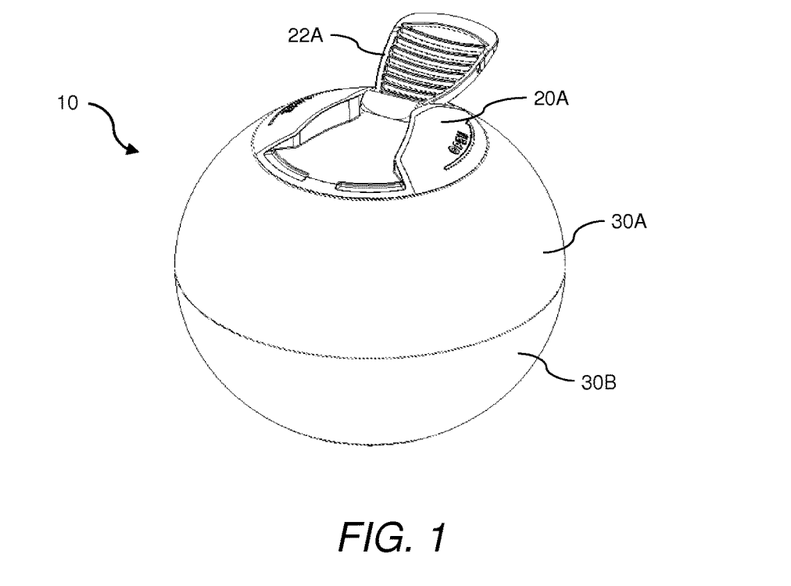
FIG. 1 shows an upper perspective view of the external configuration of an embodiment of a cooling assembly of the present disclosure with a movable flap in a projecting position.
Figure 2:
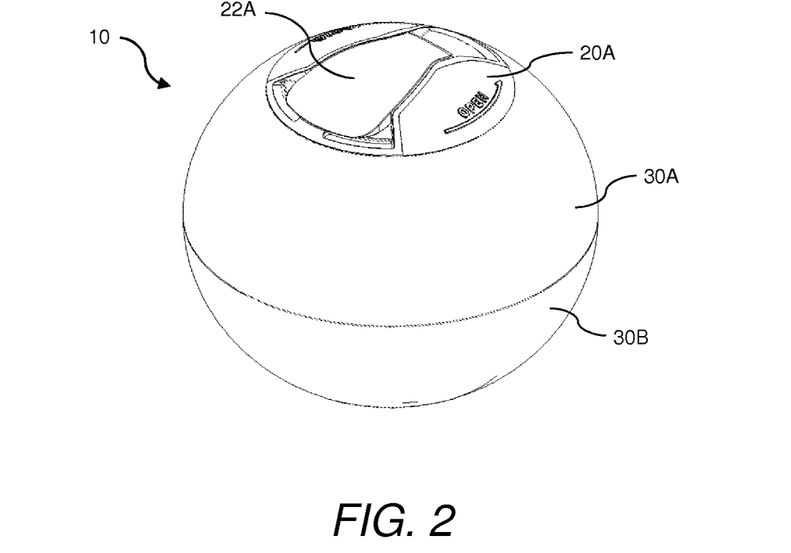
FIG. 2 shows an upper perspective view of the external configuration of an embodiment of a cooling assembly of the present disclosure with a movable flap in a closed and flush position.

FIGS. 1 and 2 illustrate one embodiment in which a lid (illustrated as inner canister lid 20A) incorporates or is associated with a movable flap 22A. In the embodiment illustrated, movable flap 22A is retained in a cavity of lid 20A when flap 22A is in a closed condition (as shown in FIG. 2) and projects from the exterior surface of cooling assembly 10 when in a projecting condition (as shown in FIG. 1) without affecting the seal formed between the lid and the outer container. In one embodiment, movable flap 22A may be hinged and mounted to lid 20A along pivot axis 24A (See, e.g., FIG. 4). In another embodiment, intermediate multiple stops may be provided along the rotational pivot path of lid 20A around pivot axis 24A, providing stable positioning of lid 20A at different rotational orientations with respect to the surface of cooling assembly 10, as will be appreciated by those skilled in the art after reviewing this disclosure. An internal surface of movable flap 22A may have surface projections such as ridges 26A, as shown in FIGS. 1 and 4. Canister lid 20A and cooling chamber lid 20B may both incorporate movable flaps 22A, 22B mounted for rotation about pivot axes 24A, 24B as illustrated in FIG. 4. These features allow stable stationary positioning of the cooling assembly when one or both of the movable flaps is/are positioned in a projecting condition. Furthermore, either of the flaps 22A, 22B, can be moved from the closed condition to the open condition (or partially open condition, when the flap is positioned in alignment with an intermediate stop), and can be used as a handle or grip, to provide a user with leverage in rotating and unscrewing the lid 20A, 20B, from its threaded engagement, or otherwise, opening the lid or removing it from the outer canister and/or outer container. Also, both movable flaps may have corresponding surface projections such as ridges 26A, 26B.

Figure 5:
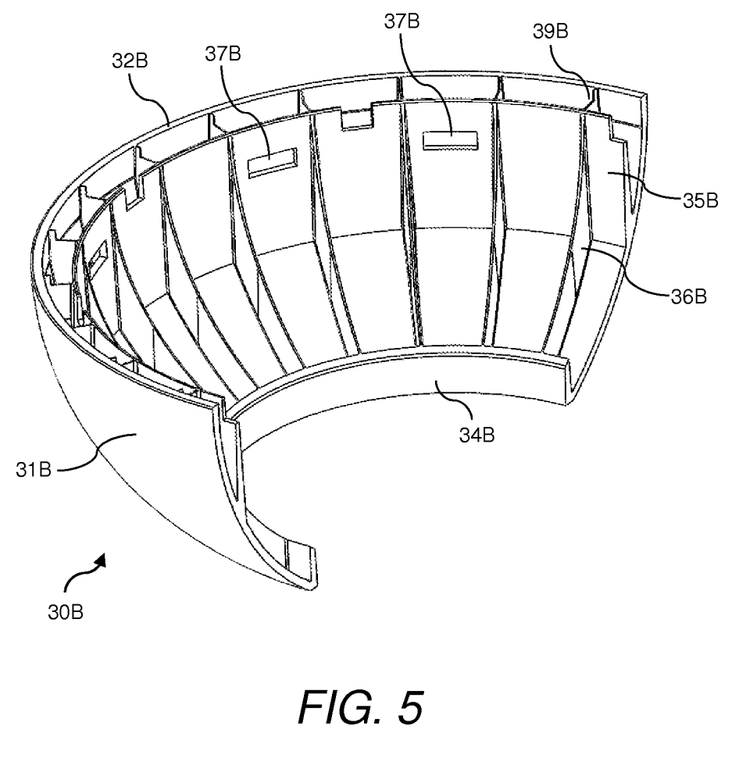
FIG. 5 shows an upper perspective cut-away view of an embodiment of an inner area of an external elastomeric shell as disclosed herein.
Figure 6:
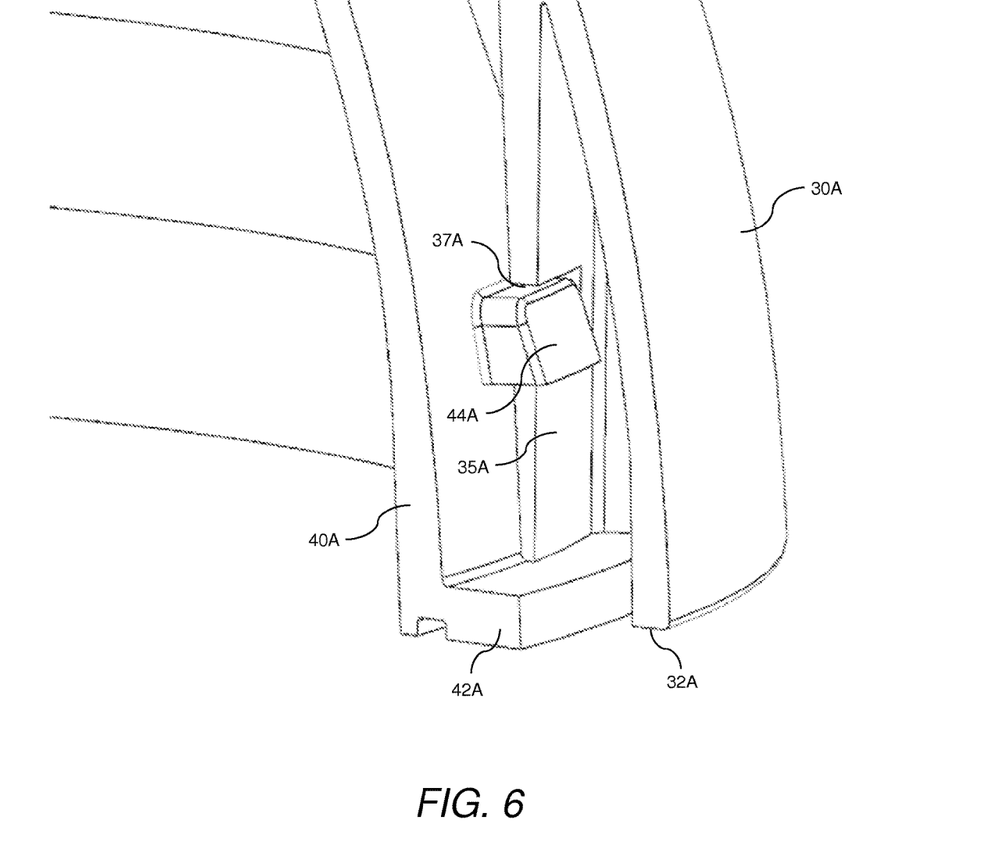
FIG. 6 shows an enlarged, cut-away view illustrating an interface of an external elastomeric shell and a rigid internal shell according to an embodiment disclosed herein.

An embodiment of a multi-layer outer container is shown in FIGS. 3 and 4; particular aspects of an exemplary external elastomeric shell are illustrated in FIG. 5, and one mechanical arrangement for interfacing and mounting a rigid internal shell to an external elastomeric shell is illustrated in FIG. 6. In the illustrated embodiment, rigid internal shell components 40A, 40B and external elastomeric shell components 30A, 30B have partially hemispherical major surfaces 31A, 31B and 41A, 41B, with larger diameter center rims 42A, 42B and 32A, 32B, respectively, and smaller diameter ports 43A, 43B and 34A, 34B, respectively, for receiving canister lid 20A and cooling chamber lid 20B. In an exemplary embodiment illustrated in FIG. 4, internal shell center rims 42A, 42B abut or rest in close proximity to one another with an (optional) sealing element, e.g. gasket 45 sealing the interface between the rigid internal shell components at the central region. In this exemplary embodiment, elastomeric shell components 30A, 30B mount over rigid internal shell components 40A, 40B and elastomeric shell center rims 32A, 32B abut or rest in close proximity to one another in an assembled condition.

FIG. 5 illustrates an inner structural framework of an elastomeric shell component according to one embodiment. The inner structural framework may be formed integrally as part of an elastomeric shell component, as shown, or it may be provided as a separate structure and associated with an elastomeric shell component during an assembly operation. In this embodiment, major surface 31B of elastomeric shell 30B is partially hemispherical, as previously described, with larger diameter central rim 32B and smaller diameter port 34B. A plurality of longitudinal ribs 36B are arranged radially and extend inwardly from an internal wall of the elastomeric shell. The longitudinal ribs may be configured and arranged to contact an external surface of the rigid internal shell when the outer container and cooling assembly are assembled. The airspace provided between the elastomeric shell 30B and the rigid internal shell 40B provides an insulating layer and reduces thermal transfer between the cooling chamber provided internally of the external chamber and the ambient environment.

Longitudinal ribs 36B may extend from port 34B and terminate at or near center rim 32B, as shown, or the longitudinal ribs may extend for a portion of this distance. The ribs are arranged radially and may have a tapered configuration in which the height of the rib (measured as the distance the rib extends inwardly from major surface 31B of the elastomeric shell) in the area of port 34B may be less than the height of the rib in the area of central rim 32B. Longitudinal ribs 36B can be generally evenly spaced around the inner surface of the elastomeric shell. The number of ribs provided may vary depending on the size and structure of the ribs, the elastomeric material of construction, the size and weight of the cooling assembly, and the like. In general, at least 4 and up to 40 or 50 longitudinal ribs may be provided.

In the embodiment illustrated in FIG. 5, a reinforcing wall 35B is provided at an inner central region of the elastomeric shell. Reinforcing wall 35B may extend in a substantially vertical direction (when a polar region of elastomeric shell 30B rests on a horizontal support) from a region of an internal surface of major surface 31B of the elastomeric shell. Longitudinal ribs 36B may intersect and/or extend through reinforcing wall 35B, as shown. A central end face 39B of ribs 36B may be notched, as shown, or otherwise configured and arranged to provide a platform for receiving the center rim of the rigid internal shell when the outer container and cooling assembly are assembled. An enlarged view of this interface is shown in FIG. 6.

Referring to FIGS. 3 & 5, a plurality of cut-outs 37B may be provided at pre-determined locations along reinforcing inner wall 35B for interfacing with cooperating structures such as tabs 44B provided on a surface of the rigid internal shell 40B for locating and interlocking the elastomeric shell 30B and the rigid internal shell 40B during assembly of the outer container and the cooling assembly. FIG. 6 illustrates an enlarged, cut-away view of the assembled outer container, including a tab 44A of rigid inner shell 40A interlocked in cut-out 37A formed in reinforcing inner wall 35A of elastomeric shell 30A.

Referring to FIG. 4, in some embodiments, when the canister lid 20A, is engaged and secured to its respective port, and outer circumferential contact rim 20A' of the canister lid can abut against a terminating rim 30A' of the elastomeric shell 30A to help brace the elastomeric shell to the remainder of the assembly. This bracing effect can help further secure the elastomeric shell to the rest of the cooling assembly, so that when the cooling assembly is in action, being rotated or agitated, the elastomeric shell is further secured to the rest of the assembly. As will be appreciated by those skilled in the art after reviewing this disclosure, opposite lid 20B can cooperate with the opposite elastomeric shell in identical or substantially similar manner.

Various elements/features described herein for any one of the shells 30A, 30B, 40A, 40B, may be provided or implemented in relation to the opposite shell in substantially similar structure and/or identical manner.

In some embodiments, methods of chilling a material in cooling assembly or ice cream maker, such as in the embodiments disclosed above, include placing the contents of the material to be chilled in an inner canister, and placing a cooling substance in a cooling chamber, wherein placing the contents in the canister or chamber involve opening a flap on a lid from a closed position to an open position, then gripping the flap manually to rotate and unscrew the lid. The method may also involve placing a flap located on an opposition lid in an open position, and filling the canister or cooling chamber with the flap located on the opposite lid stabilizing a position of cooling assembly.

In some embodiments, screwing the lid down to secure the lid on the cooling assembly, can involve placing pressure on a rim of elastomeric shell with an outside portion of the lid, to help brace the elastomeric shell on the cooling assembly so that it does not displace. Also, in some embodiments, coupling the elastomeric shell the rigid inner shell, can involve press fitting tabs into cut-outs on the elastomeric shell.

Although specific embodiments and examples of the disclosure have been described above for illustrative purposes, various modifications may be made without departing from the spirit and scope of the disclosure, as will be recognized by those skilled in the relevant art after reviewing the present disclosure. The configuration of the cooling assembly and its components, while described as spherical or partially spherical, for example, may have other configurations. Additional intermediate structures and components may be provided. The inner canister may have a different configuration from that shown and described. Ports and lids may be provided in different locations and different types of sealing mechanisms may be used. While one embodiment of an insulating and reinforcing structure is described as being formed integrally with or associated with the elastomeric shell, other types of insulating and reinforcing structures may be implemented.

In the present description, the terms "about," "approximately" and "generally" may mean±20% of the indicated range, value, or structure, unless otherwise indicated. It should be understood that the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously.

In addition, the various embodiments, structures, features and methods described may be combined to provide further embodiments. The described assemblies and components may some described elements, can add other elements, or combine the elements in different combinations than illustrated or described, to achieve various advantages. These and other changes can be made to the disclosure in light of the above detailed description. The disclosure provides non-limiting exemplary embodiments and is not intended to identify key features or essential features of the claimed subject matter. In general, in the following claims, the terms used should not be construed to be limited to specific embodiments disclosed in the specification.

What is claimed is:

1. A spherical cooling assembly comprising:
a sealable inner canister;
a sealable outer container;
a cooling chamber formed between the sealable inner canister and the sealable outer container, wherein the spherical cooling assembly comprises at least one movable flap, the flap being partially spherical and adjustable between an extended position in which it projects from an exterior surface of the outer container and a closed position in which it approximates the spherical curvature of the exterior surface of the outer container;
wherein the flap is adjustable between the closed position and the extended position without unsealing the outer container and without unsealing the inner canister;
wherein when the flap is in the closed position an internal surface of the flap faces a surface of the spherical cooling assembly and when the flap is in the extended position it has been pivoted from the closed position more than 90 degrees and the flap can be retained in the extended position; and
wherein the flap is configured such that when it is in the closed position, the spherical cooling assembly can be rolled over a surface passing over the entire flap without obstructing the rolling, and when the flap is in the extended position, the flap obstructs the rolling, whereby the flap can be used for stabilizing the spherical cooling assembly when in the extended position.

2. The spherical cooling assembly of claim 1, additionally comprising at least one canister lid for sealing an access opening of the sealable inner canister, wherein the at lease one movable flap is associated with the at least one canister lid.

3. The spherical cooling assembly of claim 1, wherein the outer container has at least one access port providing access to the cooling chamber and the spherical cooling assembly additionally comprises at least one lid for sealing the at least one access port of the outer container, wherein the at least one movable flap is associated with the at least one lid.

4. The spherical cooling assembly of claim 1, wherein the at least one movable flap is flush with the exterior surface of the outer container in the closed position.

5. The spherical cooling assembly of claim 1, comprising at least two movable flaps, each movable flap being adjustable between an extended position in which it projects from an exterior surface of the outer container and a closed position in which it is flush with the exterior surface of the outer container.

6. The spherical cooling assembly of claim 5, wherein the at least two movable flaps are located opposite one another.

7. The spherical cooling assembly of claim 1, wherein the at least one movable flap is mounted for pivotal rotation about a pivot axis to position the at least one movable flap in the extended and closed positions.

8. A spherical cooling assembly comprising:
a sealable inner canister;
a sealable outer container;
a cooling chamber formed between the inner canister and the outer container, wherein the outer container comprises an external elastomeric shell having a spherical curvature forming at least a portion of a sphere and a rigid internal shell;
a first lid sealing the outer container or the inner canister, the first lid being removable and having an adjustable flap attached thereto, the flap being adjustable between a closed position and an extended position without unsealing the outer container and without unsealing the inner canister, whereby when the flap is in the extended position it can be manually gripped about a perimeter thereof for use in removing the first lid;

wherein the flap includes an internal surface that faces a surface of the cooling assembly when the flap is in the closed position, and wherein the flap includes a partially spherical curvature of the external elastomeric shell; and wherein the flap is configured such that when it is in the closed position, the spherical cooling assembly can be rolled over a surface passing over the entire flap without obstructing the rolling, and when the flap is in the extended position, the flap obstructs the rolling, whereby the flap can be used for stabilizing the spherical cooling assembly when in the extended position.

9. The spherical cooling assembly of claim 8, wherein the external elastomeric shell has an inner structural framework comprising a plurality of inwardly extending longitudinal ribs.

10. The spherical cooling assembly of claim 9, wherein the longitudinal ribs are formed integrally with the external elastomeric shell.

11. The spherical cooling assembly of claim 8, wherein the external elastomeric shell has an inner reinforcing wall.

12. The spherical cooling assembly of claim 11, wherein the inner reinforcing wall extends along a substantially vertical direction when a polar region of the cooling assembly rests on a horizontal support.

13. The spherical cooling assembly of claim 11, wherein the external elastomeric shell additionally includes a plurality of inwardly extending longitudinal ribs.

14. The spherical cooling assembly of claim 11, wherein a plurality of cut-outs are provided in the inner reinforcing wall.

15. The spherical cooling assembly of claim 14, wherein the rigid internal shell includes a plurality of tabs positioned for interfacing with the plurality of cut-outs in the inner reinforcing wall.

16. The spherical cooling assembly of claim 8 wherein the first lid has an edge portion that mates against a rim of the external elastomeric shell when the first lid is secured to the inner canister or outer container.

17. The spherical cooling assembly of claim 8 wherein the flap is configured such that an outer end portion of the flap has a greater lateral width than an inner end portion of the flap.

18. The spherical cooling assembly of claim 8 further comprising a second lid, the second lid being secured to the spherical cooling assembly to seal the inner canister or to seal the outer container, such that the second lid is disposed on an opposite facing portion from the first lid, on the spherical cooling assembly, when both the first lid and second lid are secured to the spherical cooling assembly.

19. The spherical cooling assembly of claim 18 wherein the second lid has a second adjustable flap that can be positioned between a closed position and an extended position without unsealing either the inner canister or outer container.

20. The spherical cooling assembly of claim 8 wherein when the flap is in the extended position, it has been pivoted from the closed position more than 90 degrees and is retained in the extended position.

21. The spherical cooling assembly of claim of claim 8 wherein the internal surface of the flap is concave.

* * * * *